United States Patent [19]

Merger

[11] 3,711,469
[45] Jan. 16, 1973

[54] PRODUCTION OF 3,3-DISUBSTITUTED β-LACTAMS

[75] Inventor: Frans Merger, Ludwigshafen, Germany

[73] Assignee: Badische Anilin- & Soda-Fabrik Aktiengesellschaft, Ludwigshafen/Rhine, Germany

[22] Filed: May 19, 1969

[21] Appl. No.: 825,931

[52] U.S. Cl. ........260/239 A, 260/465.2, 260/557 R, 260/558 R, 260/561 HL, 260/562 B
[51] Int. Cl. .............................................C07d 25/02
[58] Field of Search .................................260/239 A

[56] References Cited

UNITED STATES PATENTS 3,297,754   1/1967   Bantjes ................................260/239

OTHER PUBLICATIONS

Knunyants et al., Chem. Abstracts, Vol. 55, Cols. 18696–18697 (1961).
Knunyants et al., Chem. Abstracts, Vol. 50, Col. 11277 (1956).

Primary Examiner—Alton D. Rollins
Attorney—Johnston, Root, O'Keeffe, Keil, Thompson and Shurtleff

[57]   ABSTRACT

Production of 3,3-disubstituted β-lactams by dehydrohalogenation of β-halocarboxylic amides in the presence of basic compounds at elevated temperature, and the new 3,3-disubstituted β-lactams themselves. The known and new compounds which can be prepared by the process according to the invention are valuable starting materials for the production of fibers, textile auxiliaries, pesticides and plastics.

4 Claims, No Drawings

PRODUCTION OF 3,3-DISUBSTITUTED β-LACTAMS

The invention relates to the production of 3,3-disubstituted β-lactams by dehydrohalogenation of β-haloamides in the presence of basic compounds at elevated temperature, and new substances of this type.

β-lactams (the internal cyclic amides of β-amino acids) cannot be prepared direct from the β-amino acids. The condensation of esters of β-amino acids with Grignard compounds (Liebigs Annalen der Chemie, 614, 158 (1958)), and the condensation of β-amino acids with phosphorus pentachloride in the presence of acetyl chloride (British Pat. specification Nos. 829,663 and 841,915) are uneconomical because the β-amino acids, particularly the α,α-disubstituted β-amino acids, have to be prepared as a rule in an expensive manner. 3,3-disubstituted β-lactams are also not generally accessible by the process described in Angew. Chem. 74, 523-524 (1962), by adding on chlorosulfonyl isocyanate to olefins. An article in Bulletin of the Academy of Sciences of the U.S.S.R. Division of Chemical Science, volume 1960, pages 494-501, describes the dehydrobromination of appropriate β-bromoamides with sodamide in liquid ammonia and particularly β-aryl-β-propionarylamides with potassium, sodium or lithium hydroxide or Triton B at 0° C in aliphatic ketones as solvent. Similarly, the cyclization of α,α-diphenyl-β-bromoamides by means of sodium ethylate, sodium isopropylate and the said hydroxides in ethanol into 3,3-diphenylacetidinones is also mentioned. This method cannot however be applied with good results to other α,α-disubstituted β-bromoamides (Liebigs Annalen der Chemie, 673, page 72 (1964)) so that according to the present state of the art, the cyclization with sodamide in liquid ammonia (which is suitable only to a limited extent for industrial use) is generally preferred.

Hydrides, alkyl compounds and tertiary alcoholates of alkali metals and alkaline earth metals in polar solvents are disclosed as condensing agents for β-haloamides in U.S. Pat. specification No. 3,297,754, the acidity of the basic compounds being less than or equal to that of tertiary alcohols (column 3, line 45) in polar solvents. Reaction of β-bromopivaloylamide to form pivalolactam does not take place in the presence of lithium carbonate and dimethylformamide (Table 1, Example 8).

It is an object of this invention to provide a new process for the production of 3,3-disubstituted β-lactams in a simpler manner, in good yields and in high purity.

Another object of this invention is the new 3,3-disubstituted β-lactams.

These and other objects are achieved and 3,3-disubstituted β-lactams having the general formula:

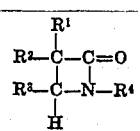

in which $R^1$, $R^2$, $R^3$ and $R^4$ may be identical or different and each denotes an aliphatic, cycloaliphatic, araliphatic or aromatic radical, $R^3$ and/or $R^4$ may also denote a hydrogen atom, $R^1$ and $R^2$ together with the adjacent carbon atom may also form a cycloaliphatic ring, are advantageously obtained by dehydrohalogenation of β-haloamides in the presence of basic compounds at elevated temperature, when a β-haloamide having the general formula:

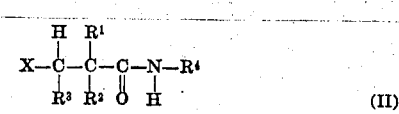

in which $R^1$, $R^2$, $R^3$ and $R^4$ have the meanings given above and X denotes a halogen atom, is dehydrohalogenated in he presence of a basic compound of a metal of main groups 1, 2 or 3 or subgroups 1, 2, 3, 4, 7 or 8, which has a higher acidity than tertiary butanol, at a temperature of from 100° to 450° C.

When bromopivaloyl-N-methylamide is used, the reaction may be represented by the following equation:

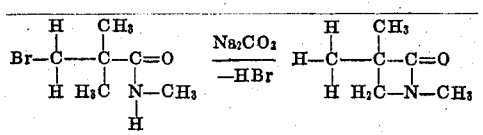

As compared with prior art methods, the process according to the invention gives a large number of 3,3-disubstituted β-lactams in a simpler way and in some cases in better yields and higher purity. Having regard to the state of the art, it is surprising that these advantageous results are achieved using the said catalysts and in the temperature range of the process according to this invention.

The starting materials used are β-haloamides having the general formula (II) which can readily be prepared by reaction of β-halocarboxylic chlorides with ammonia or amines. Preferred starting materials (II) and consequently preferred end products (I) are those in whose formulae $R^1$, $R^2$, $R^3$ and $R^4$ may be identical or different and each denotes an alkyl, cycloalkyl, aralkyl or aryl radical in each case having up to ten, particularly up to seven, carbon atoms, $R^3$ and/or $R^4$ may be a hydrogen atom, $R^1$ and $R^2$ together with the adjacent carbon atom may form a cycloaliphatic ring, preferably having five or size ring members, and X denotes a chlorine or bromine atom. The said radicals may also bear as substituents groups and/or atoms which are inert under the reaction conditions, for example chlorine or bromine atoms as substituents of an aryl radical, nitro groups, alkyl groups having one to six carbon atoms. Preferred end products (I) are in particular the new 3,3-dimethylazetidinones-(2) bearing as a substituent a phenyl radical in the 1-position which may bear one or more halogen atom as substituents, and the end products specified in Examples 10 to 15. Preferably the phenyl radical in the 1-position is unsubstituted or may bear one or two chlorine atoms and/or bromine atoms as substituents. When β-haloamides which bear no substituents on the nitrogen atom are used, varying amounts of corresponding β-hydroxycarboxylic nitriles may be formed in addition to the end product (I) depending on the chosen metal of the basic compound. In the case of diamides as starting material (II), diazetidinones-(2) are formed.

For example the following β-haloamides may be used as starting materials (II):
α,α-dimethyl-β-chloropropionamide,
α,α-diethyl-β-chloropropionamide,
α,α-diisopropyl-β-chloropropionamide,
α,α-dibutyl-β-chloropropionamide,
α-methyl-α-propyl-β-bromopropionamide,
α-methyl-α-cyclohexyl-β-bromoamide,
1-chloromethylcyclobutane carboxylic amide,
1-chloromethylcyclopentane carboxylic amide,
1-chloromethylcyclohexane carboxylic amide,
1-chloromethylcycloheptane carboxylic amide,
α,α-diphenyl-β-bromopropionamide,
α,α-di-p-tolyl-β-bromopropionamide,
α-methyl-α-phenyl-β-bromopropionamide,
α-dimethyl-β-bromopropionic acid N-methylamide,
α-dimethyl-β-bromopropionic acid N-phenylamide,
α-dimethyl-β-bromopropionic acid N-(4-chlorophenyl)-amide,
α-dimethyl-β-bromopropionic acid N-3,4-(dichlorophenyl)-amide,
α-dimethyl-β-bromopropionic acid N-(4-nitrophenyl)-amide,
α,α-dimethyl-β-bromobutyric acid N-phenylamide,
α,α-dibenzyl-β-bromopropionamide,
α,α-dimethyl-β-bromo-β-phenylpropionamide The reaction is carried out in he presence of basic compounds of metals of main groups 1, 2 and 3 or subgroups 1, 2, 3, 4, 7 or 8 with substances having a higher acidity than that of tertiary butanol, or mixtures thereof. Preferred basic compounds are the carbonates, bicarbonates, oxides, hydroxides, alcoholates and salts of organic acids, particularly of aliphatic acids, for example formates, acetates, of the above-mentioned metals. Examples of suitable metals are lithium, sodium, potassium, copper, silver, calcium, strontium, barium, mercury, lead, iron, cobalt and nickel. It is preferred to use lithium carbonate, sodium carbonate, potassium carbonate, barium carbonate, the analogous bicarbonates or lead oxide. The basic compound is as a rule used in an amount of from 50 to 200 percent by weight with reference to starting material (II).

The reaction is carried out at a temperature of from 100° to 450° C, particularly from 160° to 350° C, preferably from 160° to 250° C, atmospheric pressure or preferably at subatmospheric pressure, continuously or batchwise. As a rule a solvent is not used, particularly not a polar solvent. High boiling inert heat exchange media, for example paraffin oil or phthalic esters, may be used if desired, generally in an amount of from 100 to 300 percent by weight with reference to starting material (II).

The reaction may be carried out as follows:
The starting material and the basic compound are kept at the reaction temperature for 1 to 4 hours and advantageously the end product which forms is distilled off at the same time, preferably at subatmospheric pressure. It is advantageous to choose the reaction temperature so that it lies between the boiling points of the starting material and the end product. The end product is then separated from the distillate by a conventional method, for example by recrystallization of fractional distillation. Fractional distillation is recommended particularly for the separation of the end product from considerable amounts of nitrile as byproduct.

The reaction may also be carried out in the presence of one of the said heat exchange media with good mixing. A mixture of the basic compound and the heat exchange medium may also be brought to the reaction temperature followed by the addition to the mixture of the starting material (II), if desired in the form of a melt, at a rate corresponding to the amount of end product being distilled off per unit time. It is also possible to bring a mixture of the starting material (II) and the heat carrier to the reaction temperature and then to add the basic compound in an appropriate manner, for example with a metering screw.

The known and new compounds which can be prepared by the process according to the invention are valuable starting materials for the production of fibers, textile auxiliaries, pesticides and plastics. Reference is made to the said patent specifications and literature for details concerning their use.

The following Examples illustrate the invention. The parts specified in the Examples are parts by weight.

EXAMPLE 1

A suspension of 150 parts of lithium carbonate in 200 parts by volume of paraffin oil is heated to 200° C in a stirred vessel. One-hundred eighty parts of molten bromopivaloylamide is added in the course of 2 hours from a reservoir kept at 110° C, while stirring vigorously, and the end product is distilled off at the same time at 80 mm Hg into an ice-cooled receiver. After a total duration of 3 hours, the bottoms temperature being gradually increased to 250° C, distillation is over. The crude end product is subjected to fractional distillation and 52.2 parts of pivalolactam (equivalent to 55.4 percent of the theory) having a boiling point of 109° C at 20 mm Hg ($n_D^{20} = 1.4487$; infrared spectrum: $C = 0$ 1750) and 9 parts of starting material are obtained.

EXAMPLE 2

A suspension of 250 parts of anhydrous sodium carbonate in 200 parts by volume of paraffin oil is heated to 140° to 160° C in a stirred vessel. While stirring vigorously, 180 parts of bromopivaloylamide is allowed to flow in in the course of 2 hours and the product is distilled off simultaneously at 50 to 80 mm Hg into an ice-cooled receiver. The crude product is fractionally distilled and in the boiling range from 95° to 99° C at 13 mm Hg a mixture is obtained which consists of 32.2 parts (equivalent to 34.6 percent of the theory) of pivalolactam and 52.4 parts of hydroxypivalonitrile having a refractive index $n_D^{20} = 1.4380$ and 11 parts of starting material. Pivalolactam can be separated by renewed fractional distillation from the mixture at a boiling point of 109° C at 20 mm Hg.

EXAMPLE 3

One-hundred eighty parts of bromopivaloxylamide is dehydrobrominated with 200 parts of sodium hydrogen carbonate in 200 parts of paraffin oil as described in Example 2. 27.2 parts of pivalolactam (equivalent to 29.5 percent of the theory), 48.3 parts of hydroxypivalonitrile and 13 parts of starting material are obtained.

EXAMPLE 4

Sixty-eight parts of chloropivalolamide is intimately mixed with 100 parts of sodium carbonate and at 100 to 150 mm Hg the mixture is rapidly heated to 150° C and gradually in the course of another hour to 300° C. The distillate which passes over analogously to Example 1 gives when fractionally distilled 7 parts of starting material, 3.4 parts of pivalolactam and 5.1 parts of hydroxypivalonitrile.

EXAMPLE 5

100 parts of bromopivaloyl-N-methylamide (melting point 38° to 40° C, prepared from bromopivaloyl chloride and methylamine) is mixed well with 100 parts of sodium carbonate by grinding and heated at 80 mm Hg in distillation apparatus rapidly to 120° C and gradually in the course of another 90 minutes to 240° C. A distillate is thus obtained having a boiling point of from 80° to 110° C. Renewed fractional distillation gives 6.5 parts of starting material and 39 parts of 1,3,3-trimethylaztidinone-(2) (equivalent to 71.5 percent of the theory) at a boiling point of 63° to 64° C at 12 mm Hg.

EXAMPLE 6

200 parts of bromopivaloyl-N-phenylamide (melting point 74° to 75° C, prepared from bromopivaloyl chloride and aniline) is well mixed with 250 parts of sodium carbonate and heated at from 2 to 3 mm Hg rapidly to 120° C and gradually in the course of another 2 hours to 250° C. The distillate which passes over at from 50° to 154° C gives when fractionally distilled 12 parts of starting material and 114.3 parts of 1-phenyl-3,3-dimethylazetidinone-(2) (equivalent to 89 percent of the theory) having a boiling point of 115° to 116° C at 2 mm Hg.
Analysis:
found: C 75.2%; H 7.5%; N 7.7%; O 8.9%
calculated: C 75.40%; H 7.48%; N 7.99%; O 9.13%.

EXAMPLE 7

Two hundred parts of bromopivaloyl-N-(4-chlorophenyl)-amide (melting point 84° to 85° C, boiling point 186° to 188° C at 1 mm Hg, prepared from bromopivaloyl chloride and 4-chloroaniline) and 200 parts of sodium carbonate are rapidly heated at 10 mm Hg to 160° C and gradually in the course of another 2 hours to 350° C. The distillate passing over at from 75° to 195° C gives when fractionally distilled 11 parts of starting material and 94.9 parts of 1-(4-chlorophenyl)-3,3-dimethylazetidinone-(2) (equivalent to 69.5 percent of the theory) having a boiling point of from 124° to 125° C at 1 mm Hg; melting point 58° to 60° C.
Analysis:
found: C 63.0%; H 5.8%; N 6.5%; O 7.4%; Cl 17.0%
calculated: C 63.01%; H 5.77%; N 6.68%; O 7.63%; Cl 16.91%.

EXAMPLE 8

One hundred and ten parts of bromopivaloyl-N-(3,4-dichlorophenyl)-amide (melting point 119° to 120° C, prepared from bromopivaloyl chloride and 3,4-dichloroaniline) and 100 parts of sodium carbonate are rapidly heated at 1 mm Hg to 200° C and gradually in the course of another 90 minutes to 320° C. The distillate passing over at from 150° to 170° C gives when fractionally distilled 4 parts of starting material and 38.2 parts of 1-(3,4-dichlorophenyl)-3,3-dimethylazetidinone (equivalent to 48 percent of the theory) having a boiling point of 136° to 138° C at 1 mm Hg and a melting point of from 60° to 62° C. Infrared spectrum: CO 1750 cm$^{-1}$.
Analysis:
found: C 54.2%; H 4.5%; N 5.7%; O 6.8%; Cl 29.1%
calculated: C 54.12%; H 4.54%; N 5.74%; O 6.55%; ; Cl 29.05%.

EXAMPLE 9

100 parts of 2-methyl-2-phenyl-3-bromopropionyl-N-methylamide (melting point 96° to 98° C, prepared from methyl-2-phenyl-3-bromopropionyl chloride and methylamine) and 120 parts of sodium carbonate are heated rapidly at 3 mm Hg to 130° C and in the course of another 90 minutes to 250° C. The distillate passing over at from 60° to 170° C gives when fractionally distilled 3.6 parts of starting material and 43.7 parts of 1-methyl-3-methyl-3-phenylazetidinone-(2) (equivalent to 66.2 percent of the theory) having a boiling point of from 113° to 114° C at 1 mm Hg.

EXAMPLES 10 to 15

The following reactions are carried out analogously to Example 8 using 2.5 moles of sodium carbonate per mole of starting material: m. point = melting point in ° C

| Starting material | m.point | End product | m.point |
|---|---|---|---|
| bromopivaloyl-N-p-nitranilide | 120–121 | 1-p-nitrophenyl-3,3-dimethylazetidinone | 138–140 |
| bromopivaloyl-N-p-methoxyanilide | 111–112 | 1-p-methoxyphenyl-3,3-dimethylazetidinone | 69–70 |
| bromopivaloyl-β-naphthylamide | 112–114 | 1-β-naphthyl-3,3-dimethyl-azetidinone | 104–105 |
| bromopivaloyl-cyclohexylamide | 99–100 | 1-cyclohexyl-3,3-dimethylazetidinone | b.point 101–105 |
| bis-(bromopivaloyl)-ethylenediamide | 104–107 | N,N'-ethylene-bis-(3,3-dimethylazetidinone | 253–256 |
| bis-(bromopivaloyl)-p-phenylenediamide | 260–263 | N,N'-p-phenylene-bis-(3,3-dimethylazetidinon) | 178–180 |

I claim:

1. A process for the production of 3,3-disubstituted β-lactams having the formula:

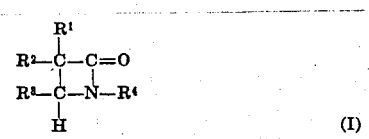

(I)

in which $R^1$, $R^2$, $R^3$ and $R^4$ may be identical or different and each denotes an alkyl, cycloalkyl, aralkyl or aryl radical in each case having up to ten carbon atoms, $R^3$ and/or $R^4$ may be a hydrogen atom and $R^1$ and $R^2$ together may be tetramethylene or pentamethylene, by dehydrohalogenation of a β-haloamide in the presence of a basic compound at elevated temperature, wherein a β-haloamide having the formula:

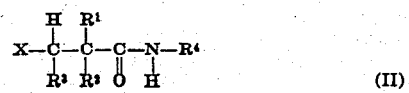
(II)

in which $R^1$, $R^2$, $R^3$ and $R^4$ have the above meanings and X denotes a halogen atom is dehydrohalogenated in the presence of a basic compound selected from the group consisting of carbonates and bicarbonates of lithium, sodium, potassium and barium in an amount of 50 to 200 percent by weight with reference to said β-haloamide in the absence of a polar solvent at a reaction temperature in the range of 100° to 450° C. and at a pressure such that said reaction temperature lies between the boiling points of the starting material and the end product.

2. A process as claimed in claim 1 wherein said reaction temperature is in the range of 160° to 350° C.

3. A process as claimed in claim 1 wherein said reaction temperature is in the range of 160° to 250° C.

4. A process as claimed in claim 1 wherein said reaction is carried out in the presence of a high boiling, inert heat exchange medium in an amount of 100 to 300 percent by weight with reference to said β-haloamide.

* * * * *